Oct. 31, 1939.  A. H. BAHNSON  2,178,463
AIR FILTER
Filed Sept. 9, 1938  2 Sheets-Sheet 1
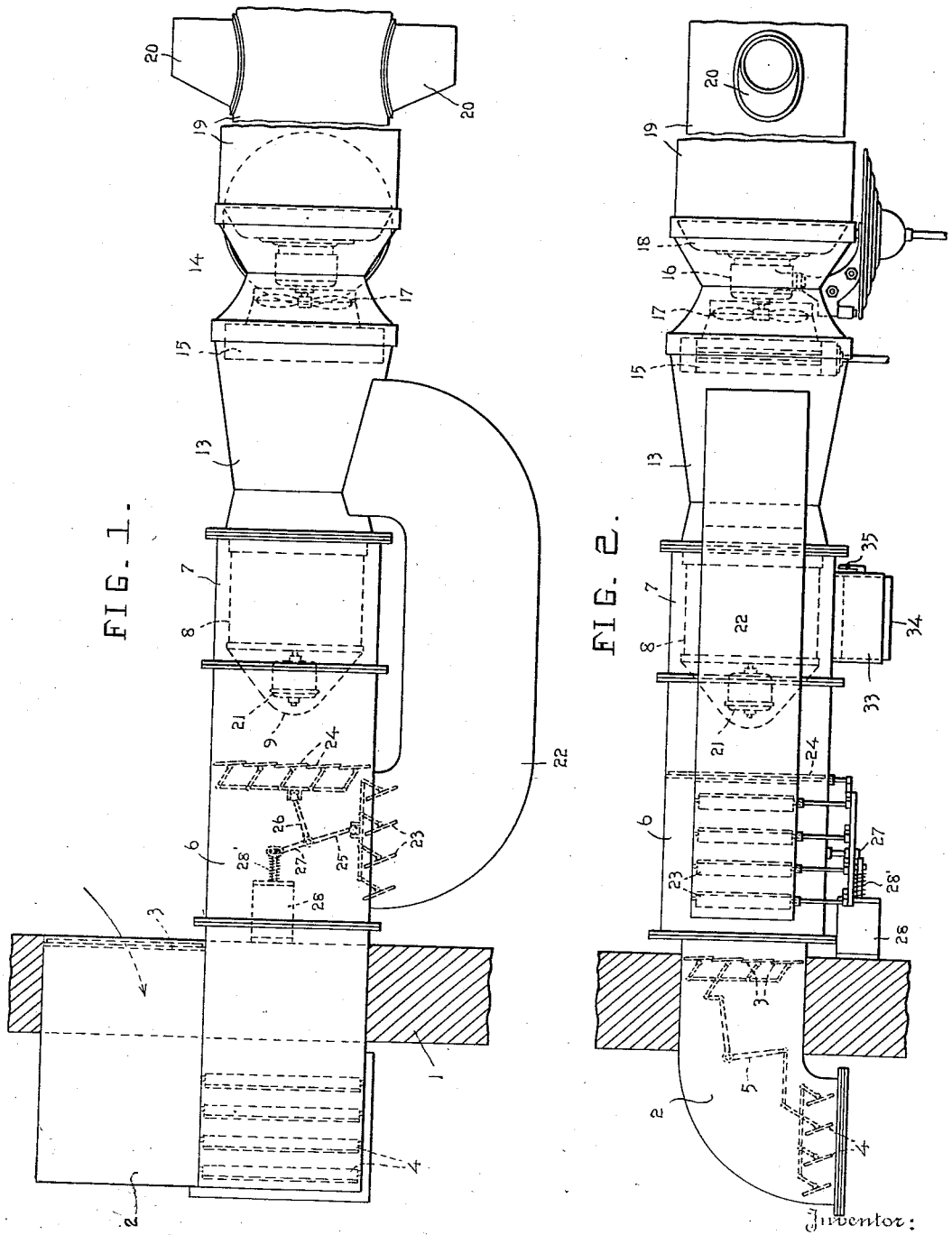

Oct. 31, 1939.                A. H. BAHNSON                 2,178,463
                                AIR FILTER
                          Filed Sept. 9, 1938              2 Sheets-Sheet 2
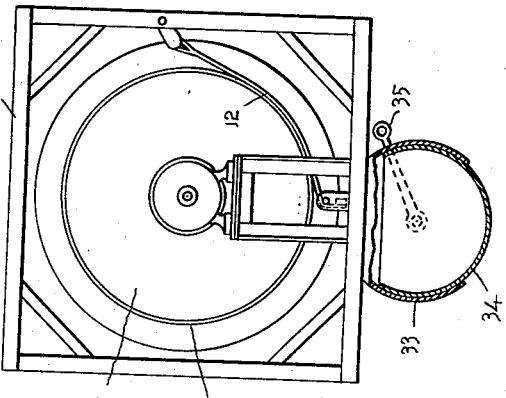
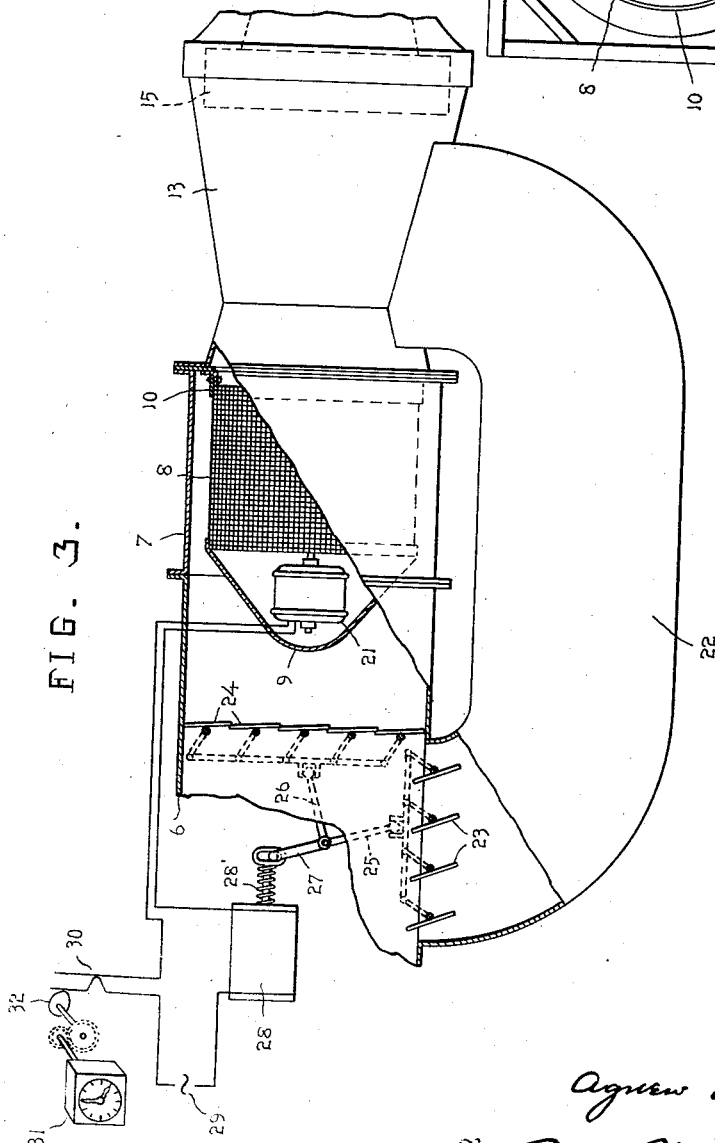
Inventor:
Agnew H. Bahnson,
By Potter, Pierce + Scheffler,
                  Attorneys Patented Oct. 31, 1939

2,178,463

UNITED STATES PATENT OFFICE 2,178,463

AIR FILTER

Agnew H. Bahnson, Winston-Salem, N. C., assignor to The Bahnson Company, Winston-Salem, N. C., a corporation of North Carolina Application September 9, 1938, Serial No. 229,180

3 Claims. (Cl. 183—53)

This invention relates to air filters and particularly to filters for use in humidifier systems of the duct type for mills or shops in which there is a continuous generation of dust or lint that should be removed from the air.

The relatively high humidity that is maintained in cotton mills rendered the customary air filters inoperative or impractical as the filters clogged rapidly and were difficult to clean. The copending application of Jerry H. Simpson, Ser. No. 171,972, filed Oct. 30, 1937, describes a "wet duct" type of humidifier system in which a filter removes the dust and lint from the circulating air stream before it reaches the humidifier and/or heater units, the filter being of such design that automatic and periodic cleaning is possible. The present invention relates to humidifier apparatus of the general type described in the Simpson application and constitutes an improvement on or further development of the Simpson invention.

An object of the invention is to provide a filter unit for use in a humidifier system of the wet duct type, the filter unit including a main filter section housing a filter and mechanism for periodically cleaning the filter, and a bypass around the filter to prevent the entrance into the air stream of dust that is dislodged from the filter during the periodic cleaning operations.

An object is to provide a filter system of the type stated which includes a common control means for energizing the filter cleaning mechanism and for opening a bypass around the filter.

An object is to provide a filter system of the duct type including a filter section, a filter in that section and having mechanism for periodically cleaning the same, a normally closed duct section bypassing the filter section, and devices for simultaneously energizing the filter cleaning mechanism and directing the air stream through the bypass duct section.

These and other objects and the advantages of the invention will be apparent from the following specification when taken with the accompanying drawings in which:

Fig. 1 is a fragmentary plan view of a humidifier duct system embodying the invention;

Fig. 2 is a fragmentary side elevation of the same;

Fig. 3 is a fragmentary plan view of the filter and bypass sections of the humidifier duct with control mechanism shown diagrammatically; and Fig. 4 is an end elevation, with parts in section, of the filter unit.

In the drawings, the reference numeral 1 identifies an outer wall of a mill or shop in which the humidifier system is located. A chamber 2 has an inlet opening at the inner side of the wall which is controlled by adjustable louvres 3 and an inlet opening at the exterior of the building that is controlled by louvres 4. The sets of louvres are connected by operating mechanism 5 for simultaneous actuation by control mechanism, not shown, to regulate the relative quantities of room air and outside air that are delivered from chamber 2 to a duct section 6. This duct section is the first element of the filter unit and opens into an axially alined filter section 7 in which a rotary drum type of screen filter 8 is mounted.

As described in detail in the Simpson application, a domed shield is located at the inlet side of the filter section, the inlet end of the filter drum 8 is closed and the outlet end is open, the air stream thus passing radially into the interior of the drum and then axially out of the drum. A flexible annular gasket 10 of leather or rubber bears on the outer rim of the screen drum 8 to seal the drum against a leakage of uncleaned air at that region. Motor 21 is positioned within the shield 9 for periodically rotating the drum, and a sheet 12 is yieldingly held in engagement with the periphery of the screen drum to facilitate the removal of deposited material from the screen surface.

An oppositely flared duct section 13 extends from the filter section 6 to an air conditioning section 14 in which a heat exchanger 15 and a humidifier are located. The humidifier is illustrated as of the type including a motor 16, fan 17 and water throwing disk section 18. The air conditioning section opens into a discharge duct 19 having outlets 20 for returning the heated and/or moistened air to the room. The motor 16 operates continuously to circulate air through the duct system, and the operation of the heat exchanger and water supply are controlled by appropriate devices, not shown.

The filter removes lint and sizing dust from the air delivered to the air conditioning section and thus prevents the clogging of the heat exchanger 15 and the deposit of an adhesive sludge in the duct section 19. A motor 21 is located within the domed shield 9 for rotating the screen drum 8 at intervals to effect a "balling" of accumulated deposits as the drum rotates in engagement with the sheet 12. The motor is not operated continuously but is periodically energized by control mechanism that will be described hereinafter.

The apparatus, as so far described, is substantially the same as that described in the Simpson application. In accordance with this invention, a duct section 22 is connected between the filter inlet duct section 6 and the filter outlet duct section 13 that follows the filter section 7. Louvres 23 are located in the inlet to the bypass duct 22, and a set of louvres 24 are provided in the section 6 beyond the duct 22. A common operating mechanism for the sets of louvres includes a T-shaped lever having arms 25, 26 for displacing the louvres in opposite sense when the arm 27 is actuated by the armature of a solenoid 28. The solenoid 28 and the filter motor 21 are connected in series with a power source 29 and switch 30 that is periodically closed by mechanism such as a clockwork motor 31 and cam 32. The design of the cam and its actuating mechanism is such that motor 9 is energized for an interval corresponding to a fractional rotation of the screen drum 8.

When the switch 30 is closed, as shown in Fig. 3, the motor 21 is energized to rotate the filter drum and the solenoid 28 is energized to move the louvres 24 to closed position and the louvres 23 to open position. The air stream is thus bypassed around the filter section during the cleaning operation and the room air is maintained in circulation without cleaning, but without entrainment therein of dust that is dislodged from the filter during the cleaning operation. The louvre operating mechanism is biased, as by a spring 28' surrounding the armature of the electromagnet 28, to restore the louvres 24 to open position when the timing switch 30 opens.

As shown in Fig. 4, the hopper into which the removed accumulations drop comprises a cylindrical housing 33 in which the shell or cylindrical trough 34 is pivotally supported. The trough 34 has a handle or crank 35 that terminates in an eye for receiving the tip of a window sash lifter or similar tool. Rotation of the hopper through 180° to discharge accumulations into a bag, not shown, seals the inlet to the hopper to prevent an air current through the hopper. This prevents a return of the finer particles of dust to the air stream.

It is to be understood that there is considerable latitude in the design of apparatus for bypassing the filter during cleaning operations, and in the mechanisms for controlling the louvres and motor, and that the invention is not restricted except as stated in the following claims.

I claim:

1. In a wet duct humidifier system, a filter unit comprising a filter duct section and a bypass duct section connected in parallel between an inlet and an outlet duct section, a screen filter rotatably supported in said filter section, cleaning means for said filter comprising a member yieldingly contacting the filter and a motor for rotating said filter, valve means at said inlet duct section for closing the bypass duct section or alternatively the filter duct section, said valve means normally closing the bypass duct section, and control means operative periodically to energize said cleaning means motor for a predetermined period and simultaneously to actuate said valve means to close said filter duct section and open the bypass duct section, whereby unfiltered air is bypassed around the filter duct section during cleaning periods to avoid the return to the air stream of dust removed from the filter.

2. A filter unit for use in a wet duct humidifier system, said unit comprising a cylindrical filter duct section between and in axial alinement with an inlet duct section and an outlet duct section, a bypass duct section between said inlet and outlet duct sections, valve means operable to close said filter duct section or alternatively the bypass duct section, means biasing said valve means to close the bypass duct section, a filter in said filter duct section, motor operated means for cleaning said filter, and control means for periodically energizing said cleaning means and simultaneously operating said valve means to close said filter duct section and open said bypass duct section, whereby unfiltered air is passed to the outlet section to maintain air flow through the filter unit.

3. A filter unit as claimed in claim 7, wherein said filter duct section is horizontally arranged, in combination with a dust hopper beneath the filter; said hopper comprising a cylindrical housing opening into the filter duct section, and a cylindrical trough rotatable in said housing.

AGNEW H. BAHNSON.

CERTIFICATE OF CORRECTION.

Patent No. 2,178,463.  October 31, 1939.

AGNEW H. BAHNSON.

It is hereby certified that error appears in the printed specification of the above numbered patent requiring correction as follows: Page 2, second column, line 42, claim 3, for the claim reference numeral "7" read 2; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.